United States Patent [19]

Crowder

[11] Patent Number: 4,567,760
[45] Date of Patent: Feb. 4, 1986

[54] FLOW DIRECTION AND STATE INDICATOR

[76] Inventor: James P. Crowder, 3834 E. Mercer Way, Mercer Island, Wash. 98040

[21] Appl. No.: 571,684

[22] Filed: Jan. 18, 1984

[51] Int. Cl.⁴ .............................................. G01P 5/00
[52] U.S. Cl. ...................................... 73/188; 116/265
[58] Field of Search ........................ 73/147, 188, 189; 116/200, 265, 275, 273; 244/199, 200

[56] References Cited

U.S. PATENT DOCUMENTS

| | | | |
|---|---|---|---|
| 1,265,420 | 5/1918 | Bieber | 73/189 |
| 2,878,672 | 3/1959 | Wikkenhauser | 73/189 |
| 3,799,106 | 3/1974 | Lamport | 116/200 |
| 3,845,734 | 11/1974 | Demos | 116/200 |
| 3,986,396 | 10/1976 | Raymond | 73/189 |
| 4,058,010 | 11/1977 | Woodhouse | 73/189 |
| 4,152,933 | 5/1979 | Woodhouse | 73/189 |
| 4,223,631 | 9/1980 | Poad | 116/265 |

*Primary Examiner*—Herbert Goldstein
*Attorney, Agent, or Firm*—Robert W. Jenny

[57] ABSTRACT

The subject indicator is a lightweight conical or cone-like member attached to a test surface at its apex by a flexure pivot. The indicators are useful, in a range of sizes, for providing visual indication of the direction and state of fluid flow past the attachment point of each indicator. The flexures may be made of string, cord or the like or, for higher temperature applications, one or more links of chain. The indicators are stable in action and do not whip.

7 Claims, 3 Drawing Figures

FLOW DIRECTION AND STATE INDICATOR

BACKGROUND OF THE INVENTION

1. Field of the Art

This invention is in the field of test apparatus, particularly the apparatus used in the field of aerodynamics and more particularly in determining and indicating characteristics of airflow over and along surfaces, such as the surfaces of aircraft, automobiles, boats, buildings and the like. More specifically the subject apparatus relates to the technique known in the art as tufting. So called tufts are attached to the areas of interest of the surface and the orientations and motions of the tufts caused by the airflow can be observed and photographed to provide information about the directions and states of the flow over the surface.

2. Prior Art

While tufting has been practiced for many years, the apparatus has remained rather rudimentary for most of that time. Briefly, lengths of flexible material such as string, thread, twine, yarn, cord, filament and the like are attached at one end to the test surface and the material tends to align with passing air. Various lengths and kinds of material are used, along with various methods of fastening the tufts to the surface, the selection of lengths, materials and fastening techniques being based on experience and experiment. The technique is used on full scale testing and in testing of models, especially wind tunnel models.

To be particularly effective on models the tufts must be small and they are then difficult to see and photograph. This problem is addressed and solved by technology developed by the subject inventor. The technology involves the use of small diameter fluorescent filaments as tufts. The tufts then are made more visible by illuminating them with light of the appropriate wave lengths to cause the fluorescense. This technique enhances the visibility and photographability of the tufts sufficiently to allow the use of very fine, flexible filaments and hence significantly enhances the use of filamentary tufts on models. This technology was published in the November, 1980 issue of Astronautics and Aeronautics.

The effectiveness of the use of tufts on larger scale equipment such as full scale airplanes is also limited to some extent by difficulties with the visibility of the tufts. Furthermore, the effectiveness is limited by the fluttering or waving of the tufts under certain conditions. The waving and fluttering involves the same physical phenomena as the waving of flags and the like. In attempts to improve visibility, larger diameter and longer tufts have been used. However, the larger and/or longer tufts seem to aggravate the tendency for self excited fluttering and present other problems. They tend to interfere too much with the flow being assessed. The fluttering makes them more difficult to attach satisfactorily, adding to the already time-consuming and relatively expensive process of installing the tufts. Also, the fluttering and waving limits the durability of the tufts.

The subject invention addresses the problems associated with visibility, fluttering, durability and installation difficulties and expense.

The closest known prior art to the invention comprises conically shaped drogues as shown in U.S. Pat. Nos. 3,251,565 and 3,310,257. Drogues are used on lines, hoses, antennas and the like trailing from aircraft to prevent whipping and flapping of the trailing elements. As is well known in the art, drogues are effective because of the drag they apply to the trailing element and, to produce sufficient drag, the cone angles are relatively large, in the range of 30° to 90°. For the purpose of the subject invention the drag of drogues at the end of the tufts would add to the problems of attachment of tufts and the drogues would have to be minute. Also, there is experimental evidence to the effect that such an application of drogues would not solve the described problems.

It is evident to those skilled in the art that tufts function, in effect, as three dimensional wind vanes, in contrast to the two dimensional wind vanes known in general as weather vanes, wind vanes, flow direction indicators and the like. The wind vanes which are the closest known prior art to the subject invention are the vanes of the type used on angle of airflow sensors such as the apparatus marketed by Rosemount, Inc. Minneapolis, Minnesota. The vane of such sensors is at the end of a pivoted arm and is wedge shaped with the sharp edge of the wedge facing into the wind (airflow). The angle between the faces of the wedge is on the order of 10° and this configuration has proven to be very stable over the full range of air flow conditions such vanes are subject to when mounted on the surfaces of airplane fuselages.

SUMMARY OF THE INVENTION

The subject devices, in a preferred embodiment, are cones attached to the test surface by flexure pivots at the apexes of the cones. The flexure pivots may be short lengths of string, cord or the like. The cones are preferably light in weight by virtue of being made of light weight material or hollow or both. Also, the outer surface is prepared with a finish such as contrasting colors, a polish or retroreflective material to augment visibility of the cones. One method to provide the retroreflective quality is to apply retroreflective, self-adhering tape to the conical surface. The cones do not whip and, because of the lack of whipping motions, the forces developed at the attach points are so small that the attachment of the flexure pivots to the test surface can be made with one piece of self adhering tape carefully applied. This reduces the time and cost of installation of the test apparatus. The method for taking optimum advantage of the retroflective characteristic is to provide an intense illumination source close to the viewing axis of the camera used to photograph the cones. The illumination source can be continuous or a flash lamp or, in certain situations, natural sun light. The indicators are useful in a range of sizes, depending on test parameters, primarily the size of the test surface.

DETAILED DESCRIPTION OF THE INVENTION

Figure 1:
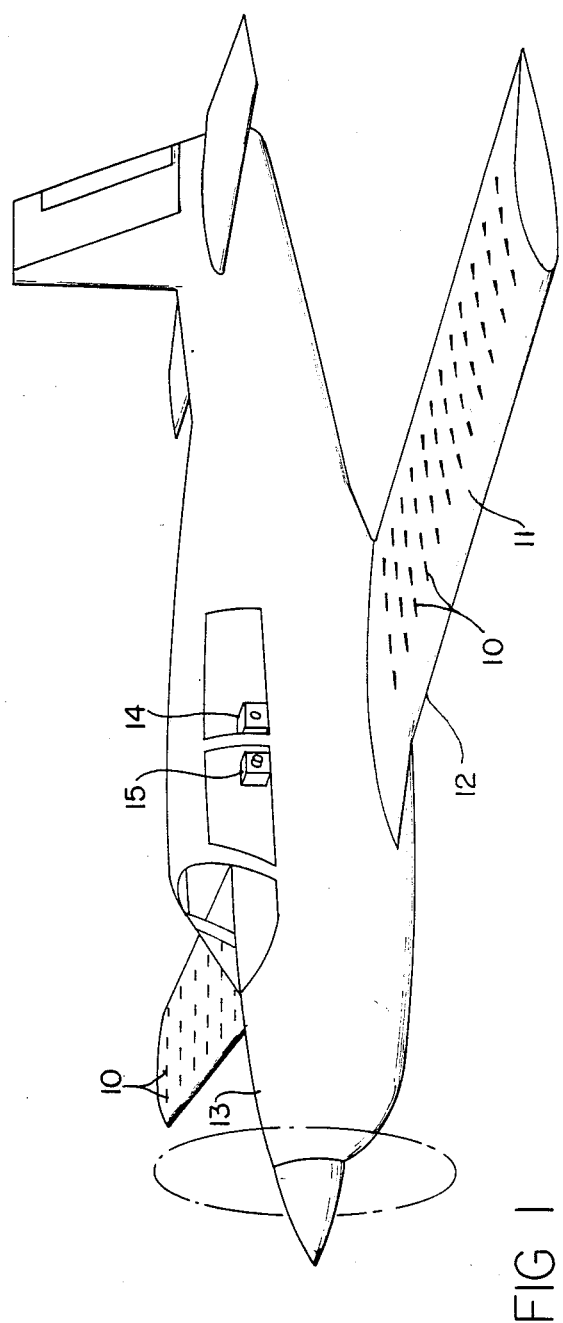
FIG. 1 is a perspective view showing an array of flow direction and state indicators set up to study flow over a portion of the upper surface of a wing on an airplane.

The subject invention is a straightforward solution to long standing problems with the use of tufts to provide visual indications of certain characteristics of the airflow over surfaces, characteristics including direction, presence of turbulence, flow separation and/or reversal. In FIG. 1 an array of flow indicators 10 is attached to the upper surface 11 of wing 12 of airplane 13. The array is in the field of view of camera 14 and can be illuminated by light emitted from lamp 15. In a typical test sequence the airplane is controlled to achieve a series of flight conditions and the state of the flow indicators is recorded photographically for each of the conditions. The states of the flow indicators often provide the indications that specific flight conditions have been achieved.

Figure 2:
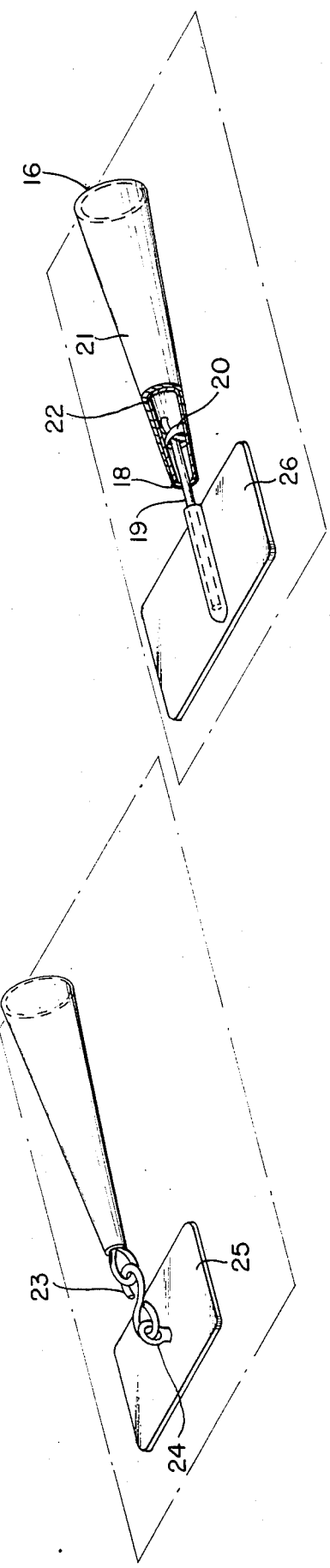
FIG. 2 is a sectional, perspective view of a preferred embodiment of a flow direction and state indicator attached to a test article surface such as the surface of an airplane wing.

FIG. 2 is a detailed, cutaway perspective view of a preferred embodiment of the subject flow indicator. The conical structure 16 is molded of stiff, resilient plastic and is the hollow frustum of a cone and the hole 18 at the small diameter end of the frustum accepts cord 19. Cord 19 is knotted at 20 and the knot is adhesively bonded in place to secure the cord with the knot tightly wedged into the cone. The cord is braided nylon and extends from the cone for a distance approximately equal to the height of the frustum. The exterior surface 21 of the frustum is covered with self-adhesive, retroreflective tape 22 manufactured by the Minnesota, Mining and Manufacturing Co. The angle of the cone is in the range of 1° to 50° with 5° to 15° being a preferred angle range.

The length of the cones used for specific tests can be readily determined by persons of ordinary skill in the art and depends on factors including test article size, distance from the camera (affects visibility) and the range of air speeds to be expected in the tests. Wall thickness is also determinable by persons of ordinary skill in the art to be sufficient to provide adequate durability while thin enough to make the cone as light as practically possible considering the characteristics of the plastic and the test conditions.

Figure 3:
FIG. 3 shows a flow direction and state indicator suitable for use in higher temperature environment.

When the air is at temperatures too high for plastic, the cones can be made of thin metal sheet stock and anchored to the test surface by one or more links of chain retained in an eye fastened to the test surface, as shown in FIG. 3. The plastic indicators can be installed by aligning the cord essentially in the direction of the predominant direction of the relative airflow and extending "into the wind", with the small end of the frustum close to the test point and then applying a piece of self adhesive tape 26 over the cord and onto the surface. The length of cord between the tape and the frustum (cone) must be as short as possible without presenting too stiff a flexure. Performance is satisfactory with length as large as 1/10 the length of the cone.

With metallic indicators the distance from the apex to the attachment point is in the same range as for the plastic (moderate temperature) indicators but it is established by the attachment line 23, FIG. 3. As shown in FIG. 3, an eye 24 is attached by brazing, welding or the like to a small metal plate 25. The plate is attached to the test surface with high temperature tolerant adhesive and the links 23 are engaged in the eye.

It can be seen from this description that the subject invention is a practical solution to the long-standing problems of poor visibility and instability of tufts (flow direction and condition indicators) used in aerodynamic testing and the associated problems of insufficient durability and interference with the flow. In addition, the subject invention expands the use of the tufting technique into higher temperature regimes. Experimental use has established that the stability and low drag of the subject indicators allows their being attached with one piece of tape. This saves significant time and money since one test may often involve a thousand or more indicators.

Preferred embodiments of the subject invention are described herein and other embodiments and variations of the invention will occur to those skilled in the art. For example, the indicators may be rectangular or triangular in crossection rather than circular or they may be cruciform or three bladed in crossection without departing from the essence of the invention which is limited only by the scope of the appended claims.

What is claimed is:

1. Apparatus for providing visual indication of flow direction and state of fluid flowing in various directions and states over a surface, said apparatus comprising:
   (a) an elongated element having a length, a conical shape, having a cone angle, a longitudinal axis, an apex, a base and an outer surface;
   (b) flexure means attached to said apex and to said surface and having a length;
   said cone angle being in the range of 5 degrees to 15 degrees, whereby said element is free to and does move to align said longitudinal axis with said various directions and to indicate by its mode and degrees of motion said various states.

2. The apparatus of claim 1, said outer surface being retroreflective.

3. The apparatus of claim 2 with said flexure means comprising a length of cord.

4. The apparatus of claim 2 with said flexure means comprising at least one link of chain.

5. The apparatus of claim 1 with said flexure means comprising a length of cord.

6. The apparatus of claim 1 with said flexure means comprising at least one link of chain.

7. The apparatus of claim 1, 2, 3, 4, 5 or 6 in which said length of said flexure means is no more than one tenth of said length of said elongated element.

* * * * *